Dec. 14, 1937.  E. L. MEYER  2,101,912
PYROELECTRIC TOOL
Filed Dec. 11, 1935  2 Sheets-Sheet 1
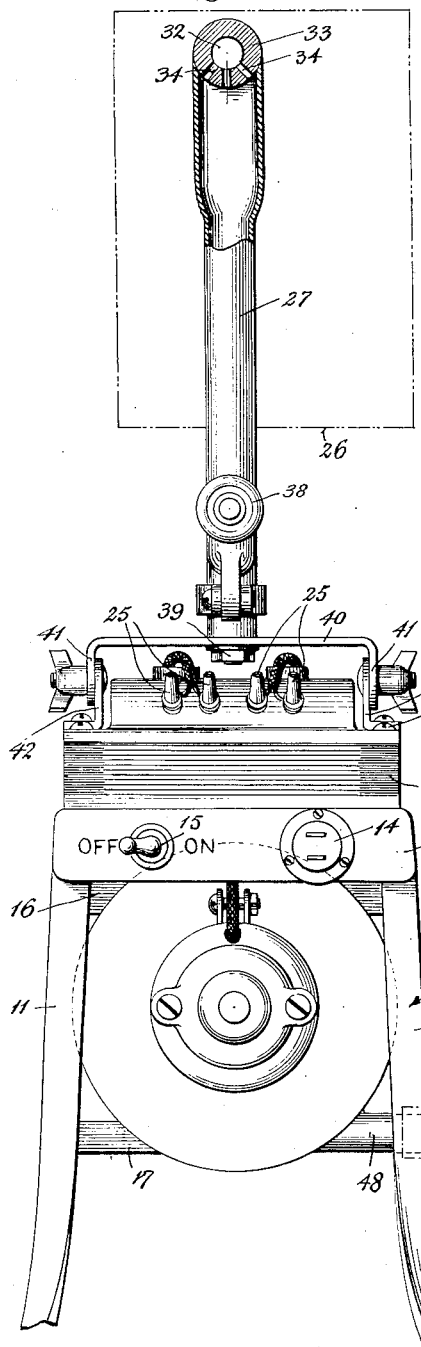
INVENTOR
Edwin L. Meyer
BY
ATTORNEY Dec. 14, 1937.   E. L. MEYER   2,101,912
PYROELECTRIC TOOL
Filed Dec. 11, 1935   2 Sheets-Sheet 2
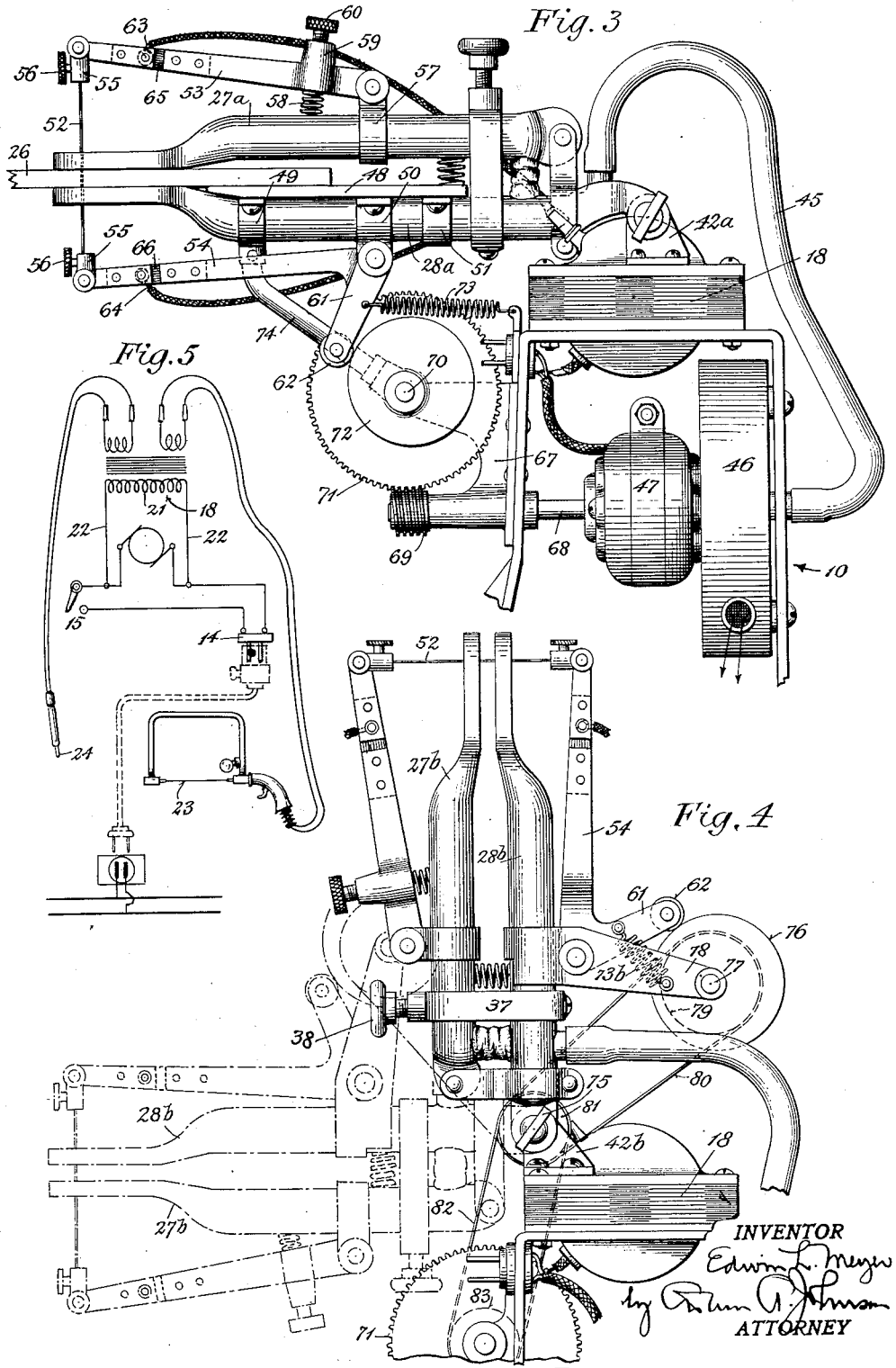
INVENTOR
Edwin L. Meyer
by [signature]
ATTORNEY Patented Dec. 14, 1937

2,101,912

UNITED STATES PATENT OFFICE 2,101,912

PYROELECTRIC TOOL

Edwin L. Meyer, Bridgeport, Conn.

Application December 11, 1935, Serial No. 53,979

21 Claims. (Cl. 219—29)

This invention relates to scroll sawing, and more particularly, to sawing and cutting wood and the like by means of a burning tool or implement. Such a burning device is disclosed in my patent, No. 2,004,580, dated June 11, 1935.

With the use of such devices indoors, a great deal of pungent smoke and acrid fumes accumulate in the room, impairing the operator's view of the work and causing discomfiture generally.

It is an object of the present invention to overcome the disadvantage of smoke diffusing into the atmosphere. This is accomplished by providing an improved pyroelectric saw having smoke-collecting and removing means which continually dispose of the smoke resulting from the burning of the work, without permitting said smoke to escape into the room.

Another object of the present invention is to provide a pyroelectric saw and smoke-removing means therefor wherein a workpiece is so positioned with respect to said means as to restrain lateral or broadside movement of said workpiece.

A feature of this invention is the provision of the smoke-receiving or collecting means in close proximity to the place at which the work is being performed, so that the smoke may be drawn in with so little draft that the cooling effect of the latter will not appreciably cool off the burning wire or blade of the saw.

Another feature of the present invention is the provision of smoke-removing means for a pyroelectric saw which is adjustable to different thicknesses of workpieces.

A further feature of the present invention is the provision of a smoke-removing means adjacent the cutting element of a saw and having a sight opening therein for viewing the work at the point of cutting.

Yet another feature of the present invention is the provision of means for restraining lateral or sidewise movement of the pyroelectric saw element, when using either a manually or an automatically motivated saw unit.

Another feature of the present invention is to provide a pyroelectric saw and smoke-remover therefor which may be used with workpieces held either vertically or horizontally.

A feature of the motivated pyroelectric saw of the present invention is the use of a single means of motivation for both the cutting element and the smoke-removing means of said saw.

Other features and advantages will hereinafter appear.

In the accompanying drawings:

Figure 1 is a front view of the pyroelectric saw unit of the present invention comprising smoke-collecting and removing means and having also energy-transforming means.

Fig. 2 is a side view of the unit of Fig. 1.

Fig. 3 is a side view of the motivated pyroelectric saw of the present invention adapted for work which is held horizontally.

Fig. 4 is a side view of a modified form of motivated pyroelectric saw, wherein the table or work-resting means and the smoke-removing means are tiltable, thereby adapting the saw for work held either horizontally or vertically.

Fig. 5 is a schematic circuit diagram of the pyroelectric saw unit.

Fig. 6 shows a modification in the orifice of the hollow smoke removing members of the present invention.

The pyroelectric saw unit of the present invention, shown in Figs. 1 and 2, comprises a stand broadly designated by the numeral 10, having two substantially U-shaped supporting members comprising front legs 11, rear legs 11a, and yoke-pieces 12. The legs 11 and 11a are twisted at their lower portions and bent slightly outward to space the feet further apart, thereby providing for a secure support. The front legs 11 of the U-shaped supporting members have attached to them near their yokes a metal panel strip 13 which carries an electric connection plug 14 and a toggle switch 15. The rear legs 11a are braced by metal struts 16 and 17, which also support a rotary blower hereinafter mentioned.

Attached to the yoke-pieces 12 is a low potential electrical transformer 18 having a shell-type closed core 19 held by bolts 20 to said yoke-pieces. The high potential side 21 of the transformer 18, see Fig. 5, is connected by the wires 22 through the switch 15 to the plug 14, receiving energy thereby from the commercial supply. The secondary side of the transformer 18 is wound to deliver low potential current for a saw 23 and also for a pen 24, and two electrically separate windings may be employed for this purpose, as shown, or one winding having a tap may be used. Referring to Fig. 1, secondary terminals 25 are provided in the shell of the transformer, for connection to the pen 24 and saw 23. It has been found desirable to energize the saw 23 with a potential of somewhat less than one volt, this value being both suitable from the electrical standpoint and from the safety standpoint. The pyroelectric saw 23 is described and illustrated in detail in my patent, No. 2,004,580, dated June 11, 1935.

According to the present invention, there are provided smoke-collecting and removing means for use with a tool such as the saw 23, and the present preferred form of said means is shown in Figs. 1 and 2. For the purpose of collecting and removing smoke from a workpiece 26 at the point where said piece is being cut, vertical tubular members 27 and 28 are provided, and these are supported on the stand 10, said members being oppositely disposed, and being shaped and positioned to allow said workpiece to be inserted a substantial distance between them.

The members 27 and 28 are preferably made from metallic pipe or tubing, and are pressed and formed at their upper portions 29 so as to be oblong in transverse section, with flat sides 30 and air passages 31, and the ends of said portions are rounded off for reasons hereinafter disclosed. The upper flattened portions 29 of each tubular member are also offset toward each other, as shown in the figures, so as to be juxtaposed to the faces of the workpiece 26.

Cutting of the workpiece 26 takes place at the flattened portions 29 of the tubular members 27 and 28, and these portions are therefore adapted to suck in air and smoke, and also to accommodate and guide the cutting element of the saw. Accordingly, the flat faces 30 of the portions 29 are provided with axially aligned apertures 32 which accommodate the cutting element of the saw 23, and means are also provided at these apertures to suck in air and smoke.

The apertures 32 in the tubular member 27 are sufficiently large to permit viewing of the workpiece 26 therethrough and yet are small enough so that the space about the cutting element of the saw at the workpiece 26 is partly confined by the sides 30, and it has been found that a diameter of approximately ⅔" for said apertures is satisfactory for all purposes. The inner aperture 32 of the tubular member 28 is also of this size, but, for the purposes of guiding the saw 23 and restraining lateral movement of the same, the outer aperture in said member is made slightly smaller, and it has been found that a diameter of approximately ⅛" is suitable for this latter. There is thus provided, by means of the apertures 32 in the tubular members 27 and 28, a means for guiding and positioning the cutting element of the saw 23. In cutting through a workpiece 26, the saw element is first passed through said apertures 32; the sides of the smaller and outer aperture 32 located in the member 28 guide and restrain laterally the cutting element of said saw.

It is to be noted here that by virtue of the above means, the cutting element of the saw 23 is fixedly positioned laterally with respect to the tubular members 27 and 28 and the supporting stand 10, and cutting progress is made only by a feeding movement of the workpiece 26, and the extent of said movement is limited in one direction only, as determined by the depth to which said workpiece may be inserted between said tubular members. By means of orifices in the hollow members 27 and 28, said orifices being closely positioned to the point of cutting of the workpieces 26 at all times, the present invention provides for quick and effective removal of smoke from this point, for it is only necessary to connect a suction device to said hollow members to effect a strong indraft through said orifices, with consequent smoke removal. In order to further facilitate the removal of smoke, the present invention also provides for modifying the orifices of the members 27 and 28 and for confining the space about the cutting element of the saw, and for this purpose washers 33 having radial passages 34 therein are affixed in the portions 29 of said members, said washers being soldered to the sides 30 or otherwise attached.

Thus, when a workpiece 26 is being cut by the saw 23 and when the flattened ends 29 of the members 27 and 28 are in juxtaposition to the sides of said workpiece, air which is being sucked through said members will have entered by the apertures 32 which accommodate the saw element and via the radial passages 34 in the washers 33, and smoke being discharged at the point of cutting will be carried with said air, and away from the work.

To provide for adjusting the members 27 and 28 so that the inner sides 30 of the upper portions 29 of the members may be brought in contact with the faces of the workpiece 26 regardless of the thickness of this latter, the tubular member 27 is pivotally mounted with respect to the member 28. The lower end of the member 27 is flattened, apertured, and sealed against air leakage, and is pivotally supported in a bracket 35 carried by the member 28. A helical compression spring 36 is placed between the members 27 and 28 for the purpose of urging these apart, the action of said spring being opposed by a double collar 37 carried by the member 28 and encircling both members, and having an adjusting screw 38 which bears against the member 27. Tightening of the screw 38 forces the members 27 and 28 together, compressing the spring 36 and shortening the distance between the flattened ends 29 of said members and vice versa.

The lower end of the member 28 is plugged and sealed against air leakage, and is threaded to receive a nut 39, and said member is attached thereby to a U-shaped bracket 40. The bracket 40 has apertured ears 41 through which pass bolts and winged nuts which secure said ears to angle brackets 42 carried on the transformer 18, and there is thus provided a pivotal mounting for the tubular members 27 and 28.

According to the present invention, the members 27 and 28 are joined at their lower portions by a section of flexible tubing 43 which fits over short nipples, not shown, held in said members. The member 28 also has a second nipple 44 attached therein, and extending from this latter is a flexible hose 45 which is connected to the low pressure or intake side of a rotary blower 46 powered by an electric motor 47. The blower 46 exhausts through the tube 48, to which a length of flexible hose 48a is attached for leading said exhaust out of a window or into an exhaust pipe.

It may be seen, therefore, that by the inventive disclosure as described above, there is provided a pyroelectric saw unit having means for collecting and removing smoke being discharged by the burning of a workpiece, and having means for positioning the cutting element of the saw with respect to said smoke-removing means, and also having means for positioning a workpiece with respect to said aforementioned means.

A motivated pyroelectric saw, according to the present invention, is shown in Fig. 3, said saw being for use with workpieces held in a horizontal position. The tubular smoke-removing members 27a and 28a are supported horizontally on the frame 10 by brackets 42a carried on the transformer 18. The member 28a is connected through a flexible hose 45 to the intake of a blower 46 powered by a motor 47. A flat table member 48 is carried on the tubular member 28a, being held by brackets 49, 50 and 51 and screws passing therethrough. By the present invention, there is provided an oscillating saw unit comprising a cutting element 52, arms 53 and 54, and cam means for actuating said arms. The element 52 is held by clips 55 having binding screws 56, said clips being pivoted at the extremities of the arms 53 and 54. The arm 53 is pivotally mounted on the member 27a by means of a clamping bracket 57, and said arm is yieldingly urged from said member by a spring 58 carried in a socket 59 integral with the arm 53, the tension on said spring being regulated by a thumb screw 60 screwing into said socket. The arm 54 is pivotally carried by the bracket 59 on the member 28a, and said arm has an integral crank extension 61 which carries a roller 62 for engagement with a cam.

Electrical connection is made from the transformer 18 to the ends of the element 52 through the clips 55 and by means of the wires 63 and 64 attached to the extremities of the arms 53 and 54, and said extremities are insulated from the remaining portions of said arms by insulating pieces 65 and 66, respectively.

Mounted on the stand 10 is a bearing piece 67 in which the shaft 68 of the motor 47a is journaled, said shaft carrying a worm 69 at its extremities. The bearing piece 67 also rotatably supports a shaft 70 which carries a worm wheel 71 engaging the worm 69, and a cam 72 which engages the roller 62 of the crank arm 61. A helical spring 73 is attached to the crank arm 61 and to the frame 10, and serves to maintain the roller 62 in contact with the cam 72, and also to provide for maintaining the saw element 52 in tension by opposing the spring 58 of the arm 53. It is, of course, obvious, that the spring 73 must be necessarily stronger than the spring 58, so that the roller 62 remains in engagement with the cam 71. For the purpose of bracing the tubular member 28a and the flat table member 48 supported thereon, a strut member 74 is provided, said member being attached to the bracket 49 carried by the member 28a, and to the bearing piece 67 mounted on the frame 10.

Energization of the motor 47 causes the shaft 68 and attached worm 69 to rotate, and motion is transmitted thereby to the worm gear 71 and cam 72, which latter actuates the crank arm 61 causing the saw to oscillate. At the same time the blower 46 is functioning, sucking air from the vicinity of the saw element 52 through the tubular members 27a and 28a and the hose 45, and when said element is energized from the transformer 18 and is cutting the workpiece 26, smoke which is discharged will be removed.

There is thus provided by the present invention a motivated pyroelectric saw having smoke-removing means, and wherein the motive power for said smoke-removing means also actuates the cutting element of the saw.

A modified form of motivated pyroelectric saw is shown in Fig. 4, wherein the saw unit and smoke-removing members are pivotally mounted as a whole and are tiltable, so that a workpiece to be cut may be held in either a vertical or horizontal plane, as suits the needs of the user.

As shown in the figure, the saw unit and smoke-removing members are positioned for a workpiece held vertically, and the horizontal portion of said unit and members is shown in dotted lines.

For this purpose, the saw unit and smoke removing members of the present invention are mounted on brackets 42b carried on the transformer 18, adjustment being effected by loosening the thumb screw 75. The crank member 61 of the saw arm 54 is actuated by a cam 76 carried on the shaft 77, said shaft being journaled in the bracket 78 mounted on the hollow member 28b, and which bracket pivotally supports the arm 54. A spring 73b is connected to the arm 61 and to the bracket 78, and yieldingly urges said arm toward said bracket, thereby maintaining the roller 62 in engagement with the cam 76. Attached to the cam 76 is a pulley 79, shown in dotted lines, carrying a belt 80 which passes over an intermediate pulley 81 axially aligned with the thumb screw 75, and said cam has power transmitted to it from said intermediate pulley. By having the axis of the intermediate pulley pass through the pivoting point of the smoke-removing and saw unit, it is possible to tilt said unit without altering the relative positions of the pulleys 79 and 81, and therefore without changing the working tension of the belt 80. Therefore, power may be transmitted to the cam 76 from the pulley 81 regardless of the position of the smoke-removing and saw unit. Attached to the intermediate pulley 81 is a similar pulley carrying a belt 82 which passes over a pulley 83 shown in dotted lines which turns with the worm gear 71, and power is thereby transmitted from said gear and by means of said belts and pulleys to the cam 76 for actuating the saw unit. The distance between the smoke-removing members 27b and 28b is adjustable by the screw 38 in the double collar 37. As seen in Fig. 4, the saw unit and smoke-removing members are positioned to receive a workpiece held vertically, and by loosening the thumbscrew 75 said unit and members may be tilted as shown by the dotted lines so as to enable the workpiece to be held horizontally.

From the foregoing it is evident that the present invention provides a motivated pyroelectric saw and smoke-removing means therefor which may be used for work held either vertically or horizontally, and that there is also provided workpiece positioning means and saw guiding means in said saw.

A modification in the extremities of the hollow members of the present invention is shown in Fig. 6. Said extremities of the smoke removing members 27 and 28 are apertured to receive stepped plugs 84, each plug having a shoulder 85, and a smaller threaded shoulder 86 intermediate its ends and a central opening 86a to receive the burning element of the saw. The opening 86a is of a size to permit of sidewise or lateral movement of a manually held saw element, and therefore, a workpiece being cut may be kept stationary, and the saw element moved instead when fine or small cuts are to be made.

It has been found advantageous to make the opening 86a ⅝ of an inch in diameter for this purpose.

The plugs 84 are screwed into the apertures of the members 27 and 28 and are supported thereby, and clearance is had between the inner ends 87 of the plugs 84, and the inner portions of the hollow members so that an annular orifice is provided in said members. In-draft means attached to said members will cause air to be sucked in through said orifice in each member as shown by the arrows, and smoke discharged in the vicinity of the plug 84 will be sucked in also and thereby removed.

Small radial orifices 88 are provided in the plugs 84 to further facilitate the removal of smoke discharged in the central openings of said plugs.

End closure members 89 are provided in the extremities of the hollow members 27 and 28 to prevent leakage of air at these points.

Variations and modifications may be made within the scope of this invention and portions of the improvements may be used without others.

I claim:

1. A pyroelectric saw having a burning element for cutting a burnable workpiece; a combined smoke-removing and work-positioning means on one side of the workpiece adjacent the burning element of the saw, said means including a pipe for collecting air containing smoke; and means for removing the air containing smoke so collected.

2. A pyroelectric saw having a burning element for cutting a burnable workpiece; a combined smoke-removing and work-positioning means on one side of the workpiece adjacent the burning element of the saw, said means including a pipe in close proximity to the burning element for collecting air containing smoke; and means for removing the air containing smoke so collected, including means for producing an indraft through said pipe.

3. A pyroelectric saw having a burning element for cutting a burnable workpiece; a combined smoke-removing and work-positioning means on a side of the workpiece adjacent the burning element of the saw, said means including a pipe for collecting air containing smoke, and said pipe having a sight opening for disclosing to view a workpiece at the point of cutting.

4. A pyroelectric saw having a burning element for cutting a burnable workpiece; work-positioning means on each side of the workpiece adjacent the burning element of the saw, said means including means for collecting air containing smoke; and indraft producing means connected with the collecting means for removing the air containing smoke so collected.

5. A pyroelectric saw having a burning element for cutting a burnable workpiece; work-positioning means on each side of the workpiece adjacent the burning element of the saw, said means including hollow members for collecting air containing smoke; and indraft producing means connected with the means for removing air containing smoke.

6. A pyroelectric saw having a burning element for cutting a burnable workpiece; work-positioning means on each side of the workpiece adjacent the burning element of the saw, said means including means comprising pivotally connected hollow members apertured to receive the burning element and positioned adjacent thereto, for collecting air containing smoke; indraft producing means; and means for connecting the hollow members with said indraft producing means.

7. The invention as defined in claim 2, in which the means for producing the indraft through the collecting and removing means includes a motivated blower having connections with the collecting pipe.

8. A smoke remover for a pyroelectric saw having a burning element for cutting a burnable workpiece, comprising means adjacent the burning element of the saw on a side of the workpiece and in close proximity to said workpiece for collecting and removing air containing smoke, said means being close to the adjacent surface of the workpiece to restrain broad side movement of the latter; and means for producing an indraft through said collecting and removing means.

9. The invention as defined in claim 5, in which there is means for adjusting the hollow members to different thicknesses of workpieces.

10. A smoke remover for a pyroelectric saw having a burning element for cutting a burnable workpiece, comprising means adjacent the burning element of the saw at each side of the workpiece and in close proximity to said workpiece for collecting and removing air containing smoke, said means being shaped to encircle the burning element of the saw on one side of the workpiece so as to restrain lateral movement of said element; and means for producing an indraft through said collecting and removing means.

11. The invention as defined in claim 4, in which the work-positioning means is pivotally mounted so that it may be swung to accommodate a workpiece held either vertically or horizontally.

12. The combination of an electrical transformer; a supporting stand for same; a pyroelectric saw for operation from said transformer, and having a burning element for cutting a burnable workpiece; and a smoke remover for said saw comprising an air impeller; motivating means therefor; means, including positioning means for the saw and work-piece extending in close proximity to said element at each side of said workpiece, for collecting and removing air containing smoke; means connecting said collecting and removing means to the low pressure side of said air impeller; and means for conveying smoke-laden air to the outside atmosphere.

13. The combination of an electrical transformer; a supporting stand for same; a pyroelectric saw for operation from said transformer and having a burning element for cutting a burnable workpiece; a smoke remover for said saw comprising an air impeller; motivating means therefor; means extending in close proximity to said saw element at each side of said workpiece for collecting and removing air containing smoke, said saw being mounted on said collecting and removing means for oscillatory motion; means operable by said motivating means for oscillating the saw; means connecting said collecting and removing means to the low pressure side of said air impeller; and means for conveying smoke-laden air to the outside atmosphere.

14. The combination of an electrical transformer; a supporting stand for same; a pyroelectric saw for operation from said transformer and having a burning element for cutting a burnable workpiece; a smoke remover for said saw comprising an air impeller; motivating means therefor; means extending in close proximity to said saw element at each side of said workpiece for collecting and removing air containing smoke, said saw being mounted on said collecting and removing means for oscillatory motion; means operable by said motivating means for oscillating the saw; means connecting said collecting and removing means to the low pressure side of said air impeller; means for conveying smoke-laden air to the outside atmosphere; said collecting and removing means being pivotally mounted on the stand so that said means and the saw may be swung to accommodate a workpiece held either vertically or horizontally.

15. The combination of an electrical transformer; a supporting stand for same; a pyroelectric saw having a burning element for cutting a burnable workpiece; means electrically connecting said saw to said transformer for energization thereby; and a smoke remover for said saw comprising an air conduit mounted on said stand; means mounted on said stand for causing an indraft in said conduit; pipes adapted to position the workpiece extending to the vicinity of said burning element on each side of said workpiece and in close proximity to the latter for collecting and removing air containing smoke; and means for connecting said air conduit to said pipes.

16. The invention as defined in claim 15 in which said pipes are pivotally mounted on said stand so that said pipes may be swung to accommodate a workpiece held either vertically or horizontally, and in which said means for connecting said conduit with said pipes is flexible.

17. The combination of an electrical transformer; a supporting stand for same; a pyroelectric saw having a burning element for cutting a burnable workpiece; means electrically connecting said saw to said transformer for energization thereby; and a smoke remover for said saw comprising pipes adapted to position the workpiece extending to the vicinity of said burning element on each side of said workpiece and in close proximity to the latter for collecting and removing air containing smoke; an air conduit connected to said pipes; and means connected to said conduit for causing an indraft in same.

18. The combination of an electrical transformer; a supporting stand for same; a pyroelectric saw having a burning element for cutting a burnable workpiece; means electrically connecting said saw to said transformer for energization thereby; and a smoke remover for said saw comprising pipes adapted to position the workpiece extending to the vicinity of said burning element on each side of said workpiece and in close proximity to the latter for collecting and removing air containing smoke, said pipes being pivotally mounted on said stand to accommodate a workpiece held either vertically or horizontally; an air conduit connected to said pipes; and means connected to said conduit for causing an in-draft in same.

19. A smoke remover for a pyroelectric saw having a burning element for cutting a burnable workpiece, comprising means adjacent the burning element of the saw at each side of the workpiece and in close proximity thereto for collecting and removing air containing smoke, said means including hollow members having apertures therein, stepped plugs located in said apertures and having central openings therein to receive said burning element, said openings permitting sidewise movement of the element, and said plugs having clearance from part of said hollow members whereby an annular orifice is provided in said members; and means for producing an indraft through said air collecting and removing means.

20. The combination of an electrical transformer; a supporting stand for same; a pyroelectric saw for operation from said transformer, and having a burning element for cutting a burnable workpiece; and a smoke remover for said saw comprising an air impeller; motivating means therefor; means extending in close proximity to said element at each side of said workpiece for collecting and removing air containing smoke; means connecting said collecting and removing means to the low pressure side of said air impeller; means for conveying smoke-laden air to a vicinity removed from the saw; means for mounting the saw on the collecting and removing means for oscillatory motion; and means for oscillating the saw.

21. The combination of a supporting stand; a pyroelectric saw, having a burning element for cutting a burnable workpiece; a smoke remover for said saw comprising an air impeller carried by the stand; motivating means therefor; means carried by the stand and extending at each side of said workpiece for collecting and removing air containing smoke; means for mounting the saw on said collecting and removing means for oscillatory motion; means for oscillating the saw from the impeller motivating means; means connecting said collecting and removing means to the low pressure side of the air impeller; and means for conveying smoke-laden air from said impeller.

EDWIN L. MEYER.